No. 874,883. PATENTED DEC. 24, 1907.
A. F. CLARKE.
LUBRICATING DEVICE.
APPLICATION FILED AUG. 14, 1906.
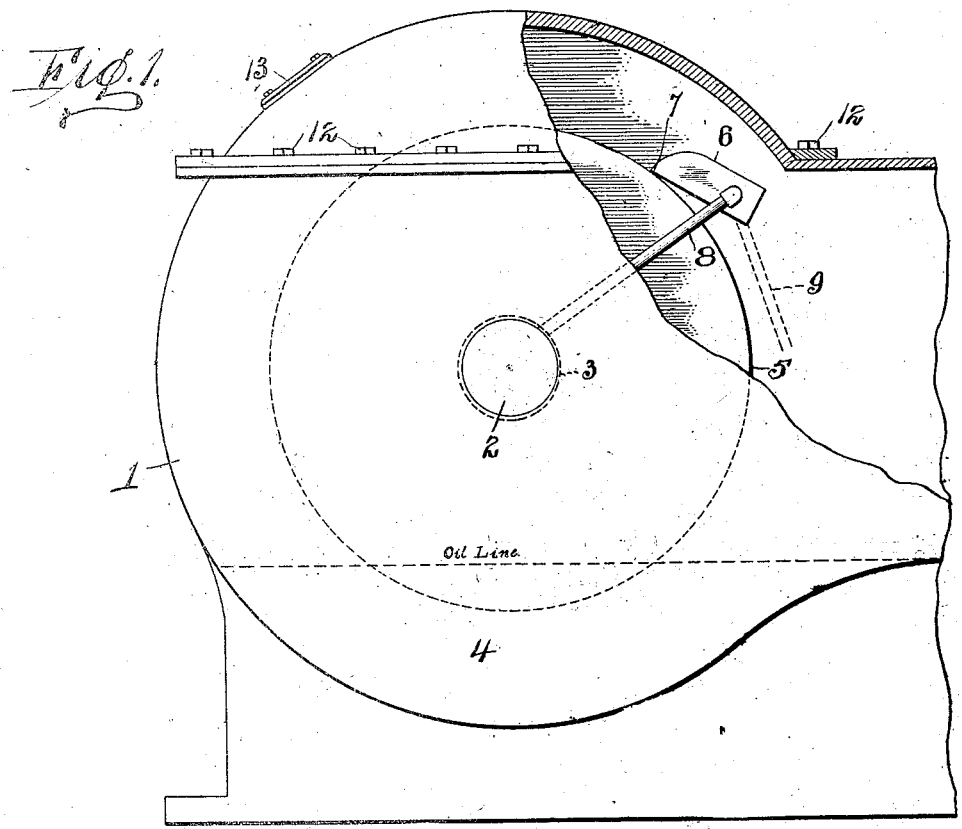
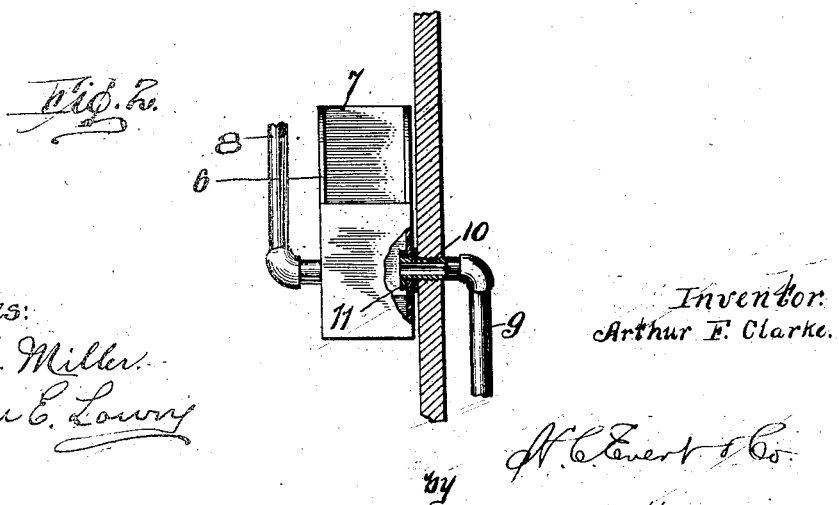
Witnesses:
Jesse E. Miller
Milton E. Lowry
Inventor.
Arthur F. Clarke.
by N. C. Evert & Co.
Attorneys.

UNITED STATES PATENT OFFICE.

ARTHUR F. CLARKE, OF BUTLER, PENNSYLVANIA.

LUBRICATING DEVICE.

No. 874,883.      Specification of Letters Patent.      Patented Dec. 24, 1907.

Application filed August 14, 1906. Serial No. 330,522.

*To all whom it may concern:*

Be it known that I, ARTHUR F. CLARKE, a citizen of the United States of America, residing at Butler, in the county of Butler and State of Pennsylvania, have invented certain new and useful Improvements in Lubricating Devices, of which the following is a specification, reference being had therein to the accompanying drawing.

This invention relates to a lubricating device, especially adapted for use with engines and like machines which employ a crank case, and its object is to provide simple and convenient means for automatically supplying lubricant to one or more moving parts of the mechanism.

The invention consists in the combination with a revoluble disk or crank of an oil chamber within which the disk or crank revolves, a suitably supported scraper or oil gathering receptacle arranged in such relation to the peripheral surface of the disk or crank as to adapt it to collect oil therefrom, and one or more oil delivery pipes leading from said scraper or oil gathering receptacle to the bearings or other parts of the machine requiring constant lubrication.

The invention also includes novel means for supporting the oil gatherer in proper relation to the disk or crank, and for adjusting said oil gatherer.

The construction of the improvement will be more specifically described hereinafter in connection with the accompanying drawing, which forms a part of this specification, and its novel features will be defined in the appended claims.

In the drawing, Figure 1 is a side elevation partly broken away of a crank case with the improved lubricating device in position therein, and Fig. 2 is a detail sectional view showing the manner of securing the oil gatherer in position.

The reference numeral 1 designates the crank casing having a crank shaft 2 mounted therein, in suitable bearings, one of which is conventionally represented by dotted lines in Fig. 1 and designated by the numeral 3.

The lower portion 4 of the crank casing serves as an oil chamber, the oil level thereof being indicated on the drawing.

Upon the crank shaft 2 is mounted a disk 5 which as shown extends down into the oil in the chamber 4. The numeral 6 designates an oil gatherer of scoop-shape supported in an inclined position, with its upturned front end 7 in close proximity to the periphery of the disk to permit the scoop-like gatherer to scrape the oil from the disk. The upper side of the oil gatherer is preferably partly covered say for about two-thirds of its length to adapt it to accumulate and hold oil. From the oil gatherer 6 extend any desired number of oil delivery pipes to convey oil to the bearings or other parts of a machine requiring lubrication. I have shown two of these pipes in the drawing one designated by the numeral 8 leading to the bearing 3 of the shaft and the other pipe 9 being adapted to convey oil to some other part of the machine.

The oil gatherer may be supported by any suitable means but I have shown in Fig. 2 a simple and inexpensive means for this purpose comprising the pipe 9, one end 10 of which extends through a threaded opening in the side of the crank case, and through a similar opening in the side of the oil gathering device, and is threaded to receive a jam nut 11 which firmly clamps the oil gatherer against the crank case. This securing device as will be apparent permits of the adjustment of the oil gatherer with relation to the periphery of the revoluble disk and by this construction the pipe 9 serves the double purpose of a conduit for the oil, and a support for the oil gatherer.

I have shown the crank case provided with the usual hood removably secured by bolts 12, and having a removable hand hole plate 13.

The operation of the improvement will be readily understood from the foregoing description in connection with the drawing and it will be apparent that the device provides a practical and inexpensive automatic oiler capable of feeding oil simultaneously to different parts of a machine.

What I claim, and desire to secure by Letters Patent, is:—

1. The combination with an oil chamber, of a rotary shaft, an oil collector in the form of a disk mounted on said shaft, to rotate therewith and extending into said oil chamber, an oil gatherer adapted to scrape the oil from the periphery of said disk, and pipes supporting said oil gatherer and communicating therewith at opposite sides thereof, the said pipes in addition to their function as a support for the oil gatherer serving as feed pipes to conduct the oil from the gatherer to the parts to be lubricated.

2. The combination with a crank case, having an oil chamber, of a shaft revolubly mounted within said crank case, a disk mounted on said shaft, and projected into the oil chamber, an oil gatherer adapted to scrape oil from the periphery of said disk, one or more pipes leading from said oil gatherer, and means for supporting the oil gatherer adjustably, comprising a threaded pipe extending through the crank case and through the oil gatherer, and a jam-nut on said pipe.

In testimony whereof I affix my signature in the presence of two witnesses.

ARTHUR F. CLARKE.

Witnesses:
A. J. TRIGG,
J. C. MILLER.